UNITED STATES PATENT OFFICE.

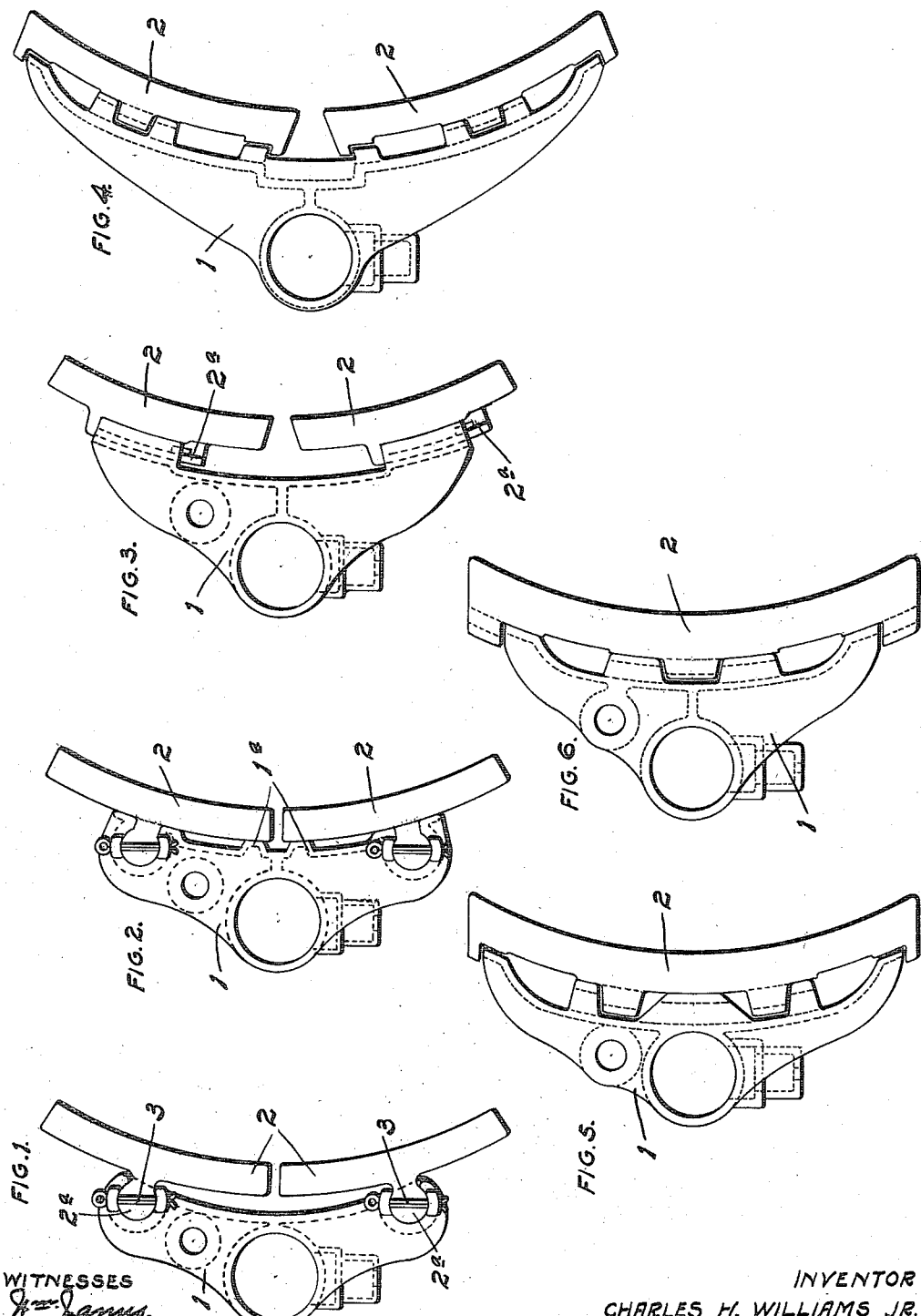

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

ADJUSTABLE BRAKE-HEAD.

979,623.  Specification of Letters Patent.  Patented Dec. 27, 1910.

Application filed January 10, 1910.  Serial No. 537,137.

*To all whom it may concern:*

Be it known that I, CHARLES H. WILLIAMS, Jr., a citizen of the United States, residing at Chicago, Illinois, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1 is a side elevational view of my improved brake head. Figs. 2, 3, 4, 5 and 6 are similar views of modified forms.

This invention relates to a new and useful improvement in brake heads, the object being to construct a head in such a manner that brake shoes having increased bearing area may be mounted thereon.

It has been determined by tests that ordinary standard brake shoes with a bearing area of approximately forty-eight square inches, can be effectively loaded to no more than 18,000 lbs. per shoe. The test referred to indicates 15,000 lbs. as the better maximum limit per shoe, but 18,000 lbs. per shoe was fixed as the absolute maximum. As the bearing area or surface of the shoe is an all important factor in the friction created between the wheel and shoe, the retarding influence of the shoe might be increased by the use of flanged shoes. Flanged shoes are, however, objectionable in the difficulty of application in small space, as for instance, in coöperating with the middle wheel of certain types of trucks such as the six-wheel Pullman, and also because the added bearing area at the wheel flange is rarely effective.

The shoe and head arrangements shown in the accompanying drawings are devised to secure the very desirable increased area in a simple and effective manner. The shoes shown can be easily applied, and by their use with automatic adjustable heads, the full bearing surface is brought into contact with the wheels so as to get the full benefit of maximum friction.

In the drawings 1 indicates an adjustable brake head such for instance as illustrated in the Robischung Patent No. 485,823, dated Nov. 8, 1892.

At or near the upper and lower extremities of the head are socket recesses in which are secured the circular bearing members 2ª of independently movable brake shoes 2. These socket bearings are preferably blind on one side so that the brake shoe bearings can be moved laterally into position, the same being held against displacement by cotter pins 3 passing through appropriate lugs as shown. While I have shown two brake shoes pivotally mounted upon the inner face of the head, it is obvious that three or more shoes can be pivotally arranged upon the head if desired. When the brakes are applied, instead of forcing a rigid head against the wheel and losing the effectiveness of the friction contact by reason of the difference between the arc of the periphery of the wheel and the arc of the face of the shoe in each changed position, no matter how slight the change is when the shoe is applied to the wheel, I am enabled, by dividing the shoe into sections, which are independently movable and using the brake head as an equalizer between the shoes, (where two shoes are employed) to get the maximum value of the frictional contact. Any uneven wear between the independently movable shoes will be taken up and compensated for by the head acting as an equalizer.

In Fig. 2 I have shown a modification in which there is provided a stop shoulder 1ª on the head for limiting the movement of the inner ends of the shoe sections. In Fig. 3 I have shown another modified form in which the shoe sections are substantially rigid on the heads, that is they are slipped vertically into position, and there held by means of T-shaped interlocking ribs 2ª as shown.

In Fig. 4 I have shown another modified form in which the sections of the shoe may be secured in position by a key as in the well known type of Christy head.

In Figs. 5 and 6 I have shown a shoe as a single friction element said shoe extending above and below the head.

In all of these forms the increased surface provided by the shoes where a plurality are used, or where a single shoe is employed, enables my invention to be used in connection with high speed brake beams where it is necessary to utilize to the best advantage the maximum braking power. So far as I am aware of existing railroad conditions, and those which have prevailed herebefore where a small braking power only was available, where the brake beams were light and wholly unfit for high speed service, necessitating the heavy brake beams employed today, it was impossible to utilize, to good advantage, brake shoes having an area exceeding forty-eight square inches. On the contrary, shoes having a smaller area were frequently employed. It will be seen, therefore, that according to my invention which is designed especially for heavy high speed brake beams, that it is possible to utilize the greatest braking power now available to the best advantage and secure the best braking results.

I claim:

1. The combination of a brake head and a brake shoe projecting beyond the ends thereof, said shoe having a movement independent of the head.

2. The combination of a brake head and a brake shoe projecting beyond both ends thereof, said shoe having a movement independent of the head.

3. The combination of a brake head and a sectional brake shoe secured thereto, each section of said shoe having a movement independent of the head.

4. The combination of a brake head and independently movable brake shoes arranged thereon.

5. The combination of a brake head and a brake shoe composed of sections which are independently detachable.

6. The combination with a pair of brake shoes and a brake head upon which said shoes are mounted, said brake head acting as an equalizer.

7. The combination of a pair of brake shoes and an equalizing head upon which said shoes are mounted.

8. The combination of a brake head and a pair of brake shoes pivotally mounted thereon, said brake head acting as an equalizing lever to apply equal power to both shoes.

9. The combination of a brake head, and a brake shoe extending beyond the end of said head and pivotally secured thereto.

10. The combination of a brake head, and a plurality of brake shoes pivotally connected thereto.

11. The combination of a brake head, and a plurality of brake shoes pivotally connected thereto, and coöperating with stops on said head.

In testimony whereof I hereunto affix my signature in the presence of two witnesses, this 27th day of December, 1909.

CHARLES H. WILLIAMS, JR.

Witnesses:
EDWARD T. WALKER,
J. W. WEINLANDS.